United States Patent Office 3,499,038
Patented Mar. 3, 1970

3,499,038
OXIDATION OF ETHYLENICALLY UNSATURATED HYDROCARBONS
Edgar L. McDaniel and Howard S. Young, Kingsport, Tenn., assignors to Eastman Kodak Company, Rochester, N.Y., a corporation of New Jersey
No Drawing. Continuation of application Ser. No. 311,989, Sept. 27, 1963. This application Aug. 22, 1966, Ser. No. 574,252
Int. Cl. C07c 45/04; B01j 11/82
U.S. Cl. 260—604                    4 Claims

ABSTRACT OF THE DISCLOSURE

Unsaturated aldehydes, e.g., acrolein or methacrolein, are manufactured by oxidizing an olefin having at least 3 carbon atoms, e.g., propylene or isobutylene, in the presence of a solid catalyst comprising bismuth oxide and hexamolybdochromic acid. Reaction temperatures of 300° C. to 600° C. are disclosed.

---

This application is a continuation of our copending application Ser. No. 311,989, filed Sept. 27, 1963 and now abandoned; which was copending with and a continuation-in-part of our application Ser. No. 127,824, filed July 31, 1961, now U.S. Patent 3,253,014, which was copending with and a continuation-in-part of our application Ser. No. 83,916, filed Jan. 23, 1961, now U.S. Patent 3,262,962.

This invention relates to an improved process for the preparation of carbonylic compounds by the oxidation of an ethylenically unsaturated hydrocarbon. More particularly, this invention relates to the preparation of an unsaturated aldehyde by the catalytic oxidation of an α-olefin. In a specific aspect, this invention relates to the high temperature, vapor phase, oxidation of propylene to form acrolein in the presence of a catalyst comprising bismuth oxide and hexamolybdochromic acid.

It is known that carbonylic compounds can be prepared by the catalytic oxidation of ethylenically unsaturated hydrocarbons such as propylene and isobutylene. However, such processes are subject to a number of disadvantages and are not, therefore, wholly desirable processes for the preparation of carbonylic compounds. Thus, except for a few noteworthy exceptions, prior art workers have been unable to provide such an oxidation process employing a catalyst that is highly active and selective under the conditions of reaction, exhibits high activity which remains over long periods of time, is easily regenerated in the event such becomes desirable, possesses a high degree of thermal stability and is not deleteriously effected by saturated hydrocarbons often present in a feed stream. It is evident, therefore, that a novel process for the oxidation of ethylenically unsaturated hydrocarbons, particularly α-olefins, employing a catalyst fulfilling the aforementioned requirements will greatly enhance the art.

Accordingly, it is an object of this invention to provide a novel process for the preparation of carbonylic compounds.

Another object of this invention is to provide a novel process for the continuous, high temperature, vapor phase catalytic oxidation of α-olefins such as propylene.

Another object of this invention is to provide a novel process for the preparation of acrolein.

Another object of this invention is to provide an improved catalytic oxidation process employing a novel metal containing catalyst that has not been previously employed in the oxidation of α-olefins.

Still another object of this invention is to provide a novel catalyst comprising bismuth oxide and hexamolybdochromic acid and an oxidation process employing this catalyst.

Other objects and advantages of the present invention will become apparent from an examination of the following specification and claims.

The above objects are obtained by oxidizing an α-olefin containing at least 3 carbon atoms, at a temperature in the range of about 300° to about 600° C. in the presence of a novel catalyst comprising hexamolybdochromic acid and bismuth oxide, as hereinafter described.

The novel process of this invention is effective for the oxidation of α-olefins containing at least 3 carbon atoms, alone or admixture, and is particularly effective with the α-monoolefins containing 3–12 carbon atoms. By the practice of this invention, these α-olefins are readily converted to a carbonylic compound containing the same number of carbon atoms in a simple, economic and direct manner. Thus, isobutylene is readily oxidized to methacrolein and propylene to acrolein. This activity was quite unexpected in view of the fact that ethylene, when employed in this process, undergoes no detectable oxidation.

The composition of the feed streams employed in the practice of this invention can be varied over a wide range. When operating in a continuous manner with oxygen in the feed, for example, the amount of such oxygen can be varied over a wide range depending upon the design of equipment in use, the temperature, contact time, partial pressure and other variables, as is obvious to those skilled in the art.

Any of the aforementioned α-olefins, but preferably the aliphatic α-monoolefins containing up to 12 carbon atoms, can be employed in the practice of this invention. The α-olefins employed can be exemplified by propylene, isobutylene, butene, hexene, heptene, octene, decene, dodecene, butadiene, pentadiene and the like. The total conversion of starting material can be increased by recycling reaction products as a whole, or even further, by separation and recycling of unreacted ethylenically unsaturated hydrocarbons.

As already indicated, the catalyst employed in the practice of this invention comprises at least two components, one of which is bismuth oxide and the other hexamolybdochromic acid. It is quite surprising that these two components can be combined to form catalysts which can be used to oxidize α-olefins since either component of the catalyst alone is ineffective under conditions where the two components together are extremely effective, as shown by Examples 9–12 which follow.

The hexamolybdochromic acid that is used as one component of the catalyst is believed to be capable of being represented by the empirical formula $H_3CrMo_6O_{21}$ as described by L. C. W. Baker et al., Journal of American Chemical Society, 77, 2136–42 (1955). In practice, the ammonium salt of this acid is generally employed because it is more easily prepared than the free acid and decomposes, at least in part, to the free acid at the temperatures used during the formation of the catalyst. It is not known whether the conversion to free heteropoly acid is quantitative and, therefore, catalysts containing residual ammonium salt are contemplated as being within the scope of the invention disclosed and claimed.

The heteropoly acid and/or ammonium salt used in the preparation of the catalyst can be readily prepared by any of the suitable procedures employed in the art for this purpose. For example, ammonium hexamolybdochromiate can be prepared by a method similar to that disclosed by Hall in the Journal of American Chemical Society, 29, 695 (1907). Thus, 80 grams of chromic sulfate hydrate and 21.6 grams of ammonium sulfate are dissolved in 1,000 ml. of water, and the solution filtered. This solution is then mixed with a filtered solution of 354 grams of ammonium heptamolybdate and 2,000 ml. of water. The solution is stirred and heated for about ¾ of an our to a temperature of about 75° C. The original dark green-black solution slowly changes to a pale rose-red solution with a crystalline precipitate of the same color. After cooling, the precipitate is collected in a Buchner funnel with the aid of suction and the crystals recrystallized from water and air dried.

Bismuth oxide is employed as another component of the catalyst in the oxidation process of this invention. This metal oxide is admixed with the heteropoly acid and the resulting mixture is then calcined at elevated temperatures, for example 460–600° C., for several hours or more. It is possible that the two components of the catalyst react to form a salt which is the active oxidation catalyst component. However, this is only a possible explanation and is not intended to limit the invention to the formation and use of salts in the process of this invention. Bismuth oxide, per se, or other bismuth derivatives which decompose, at least in part, to form bismuth oxide in the calcination procedure, can be employed. It is not known whether this conversion is quantitative and, therefore, the presence of unreacted bismuth salt is contemplated as being within the scope of the invention. Bismuth compounds which can be employed in the preparation of the novel catalysts of this invention include bismuth oxide, bismuth subcarbonate, bismuth hydroxide, bismuth subnitrate, bismuth oxalate, bismuth tetraoxide, bismuth pentoxide, bismuth oxysulfate, and the like. Bismuth metal, since it oxidizes, at least in part to form bismuth oxide during calcination, can also be used in the preparation of the catalyst. The concentrations of the bismuth component and heteropoly acid component in the catalyst can vary from about 2 to about 75%, by weight, desirably from about 5 to about 50%, by weight, and preferably about 25 to about 40%, by weight, of either component based on the mixture.

The reaction involved in the process of this invention can be illustrated by the following equation using propylene as an example:

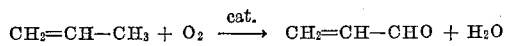

$$CH_2=CH-CH_3 + O_2 \xrightarrow{cat.} CH_2=CH-CHO + H_2O$$

The theoretical mole ratio of $\alpha$-olefin to oxygen for the reaction involved in the process of this invention is 1:1. In practice, it is preferred to use ratios near these values. However, $\alpha$-olefin to oxygen ratios of from 1:0.05 to about 1:10, and preferably from about 1:0.5 to about 1:3, are operative. Water can also be added to the feed stream or it can be omitted. When used, water acts as a diluent and can be employed in amounts of 0.05 to about 2 moles per mole of $\alpha$-olefin in the feed. Nitrogen is not detrimental to the reaction and therefore, the gaseous oxidizing agent employed in the process of this invention can be air. If air is used, the ratio of oxygen to nitrogen should be approximately 1:4.

The temperature employed in the process of this invention can be varied within wide limits, including temperatures from about 300° to about 600° C. with temperatures in the range of about 350° to about 550° C. being preferred. The reaction is not significantly pressure dependent and, therefore, the process of this invention can be carried out satisfactorily at atmospheric pressure, which condition is preferred. However, sub-atmospheric or super-atmospheric pressures can also be used and give generally good results.

The catalyst is capable of use either in a fixed bed or a fluidized state. The latter method is particularly advantageous since it permits extreme ease of temperature control in highly exothermic reactions of the type involved in the present invention. In contrast, temperature control in a fixed bed is very difficult. The oxygen employed in the process can be fed in elemental form, as air, or in admixture with diluents, for example, carbon dioxide, water, or with inert gases such as nitrogen, argon and the like.

The catalyst can be employed in the process of this invention without being supported on an inert carrier. However, the use of a carrier has been found to be advantageous in the practice of this invention and it is preferred that such be used. Carriers can be used in amounts up to about 96%, by weight, although amounts in the range of about 25 to about 40%, by weight, are generally used. Such carriers include any one or mixtures of the conventional supports known in the art, for example, silica, pumice, kieselguhr, titania, alumina, magnesia, silica-alumina, magnesium oxide, zirconia, thoria, clays, and silica gel.

In practicing the invention, any type of apparatus suitable for carrying out the reaction in the vapor phase can be employed, including, for example, a tubular type of reactor or furnace that can be operated in continuous or intermittent manner and which is equipped to contain the catalyst in intimate contact with the entering feed gas. As already indicated, the use of a reactor containing a catalyst "fluidized-bed" is preferred since the temperature of the reaction can be closely controlled with ease. The reacted gases are conducted to suitable cooling and separatory equipment and the products further separated and recovered by any of the conventional methods known to those skilled in the art. One such recovery method involves contacting the effluent gases from the reactor with cooled water or an appropriate solvent to remove the products of the reaction. In such case, the ultimate product can be separated by conventional means such as distillation of the resulting liquid mixtures. Unreacted $\alpha$-olefins can be recovered and recirculated through the system. Spent catalyst can be reactivated by heating in contact with air at the temperature and contact time generally employed in the reaction.

The excellent results obtained by the preparation of carbonylic compounds from $\alpha$-olefins containing at least 3 carbon atoms according to this invention is readily appreciated from an examination of the examples which follow. The apparatus employed in carrying out the runs described in these examples is a "fluidized-bed" reactor. The reactor is constructed of Vycor glass and is cylindrical with a conical bottom. The internal diameter of the lower portion is 40 mm. for 25 cm. of height and the upper portion of the reactor is 55 mm. in diameter. The feed gases are introduced into the bottom of the reactor serving to fluidize the catalyst. Thus, the reaction is carried out using a "fluidized-bed." The reactor is heated electrically.

The effluent gases and vapors from the reactor are introduced into traps cooled with a Dry Ice bath. The condensate consists almost entirely of oxidized $\alpha$-olefin and water. The non-condensable gases are led from the traps through a gas sampling valve and then through a test meter. Thus, at intervals the gas stream can be sampled and the cold traps removed from the bath, thawed, and the condensate diluted with water. The traps can be washed out with water, and the total aqueous solution readily analyzed. This technique is expedient for the purpose of illustrating the invention. However, other suitable methods that are well known to those skilled in the art can be used with equal success. The definitions used in the examples are as follows:

Contact time is the average time which the reactants spend at reaction conditions in a volume equal to that of the bulk catalyst bed. In practicing this invention, contact times are generally in the range of about 0.05 to about 30 seconds, although contact times of about 0.1 to about 10 seconds were preferred.

The production rate of carbonylic compound over the catalyst is an important measure of its effectiveness. The spacetime yield corresponds to this production rate and is the number of grams of carbonylic compound produced per liter of catalyst per hour of use (abbreviated g./l.-hour).

The percent conversion of α-olefin to carbonylic compound $$= \frac{\text{moles of carbonylic compound formed}}{\text{moles of } \alpha\text{-olefin fed}} \times 100$$

The percent yield of carbonylic compound $$= \frac{\text{moles of carbonylic compound formed}}{\text{moles of } \alpha\text{-olefin consumed}} \times 100$$

This invention can be further illustrated by the following examples of preferred embodiments thereof although it will be understood that these examples are included merely for purposes of illustration and are not intended to limit the scope of the invention unless otherwise specifically indicated.

EXAMPLE 1

As already indicated, α-olefins containing at least 3 carbon atoms, such as propylene, can be oxidized at high temperatures in the presence of bismuth oxide and hexamolybdochromic acid, preferably supported on an inert carrier. To illustrate, 163.5 grams of pulverized ammonium hexamolybdochromate is added to 400 grams of an ammonia-stabilized silica sol which is 30% silica. The slurry is stirred and heated and to it is added a solution of 308 grams of bismuth nitrate pentahydrate in 230 ml. of dilute nitric acid. The slurry is stirred and heated until it sets to a gel. After drying about 15 hours on a steam bath, this mixture is calcined 4 hours at 500° C. in a muffle furnace.

The catalyst is crushed, sieved, and 200 ml. of 40–120 mesh material is charged to the reactor described above. A feed gas stream comprising 286 ml. of propylene and 1430 ml. of air and 286 ml. of water vapor per minute (S.T.P.) is fed to the reactor. The reaction temperature is 480° C. and the contact time is 2.2 seconds. Over a period of 30 minutes operation at these conditions, 2.1 grams of acrolein is collected corresponding to an acrolein conversion of 9.9% with a yield of 23.7% and a space-time yield of 21.1 grams acrolein per liter of catalyst per hour.

The substitution of other α-olefins containing at least 3 carbon atoms, such as butene, isobutylene, pentene, 4-methyl-1-pentene, 2-methyl-1-butene in the above procedure gives the corresponding oxidation products. However, the use of ethylene in this procedure gives no ketene or acetaldehyde which shows that the catalyst is very specific in its operation.

EXAMPLE 2

As previously indicated, nitrogen can be present in the feed stream. To illustrate, an equal volume of nitrogen is substituted for the water vapor in the procedure of Example 1 which is repeated. Over 30 minutes of operation 1.9 grams of acrolein is obtained. The conversion is 8.8% with a yield of 21.2% and a space-time yield of 18.8 grams per liter per hour.

EXAMPLE 3

150 ml. of a catalyst comprising 37% bismuth oxide and 33% hexamolybdochromic acid is charged to the reactor described above. A feed gas stream comprising 166 ml. propylene, 912 ml. of air and 497 ml. of water vapor per minute (S.T.P.) is fed to the reactor. The reaction temperature is 430° C. with a 2.2 seconds contact time. Over a period of 60 minutes operation at these conditions, 2.56 grams of acrolein are recovered corresponding to a conversion of 20.6% and a yield of 43.9% and a space-time yield of 35 grams per liter per hour.

EXAMPLE 4

A catalyst comprising 37% bismuth oxide and 33% hexamolybdochromic acid on silica is sieved and 150 ml. of 80–120 mesh catalyst is charged to the reactor described above. A feed gas stream comprising 196 ml. of propylene and 1161 ml. of air per minute (S.T.P.) is fed to the reactor. The reaction temperature is 404° C. with a 1.78 second contact time. Over a period of 26 minutes operation at these conditions, 2 grams of acrolein are recovered from the effluent stream. This corresponds to a conversion of 15.7%, a yield of 41.4% and a space-time yield of 30.8 grams of acrolein per liter of catalyst per hour.

EXAMPLE 5

The procedure of Example 4 is repeated at a temperature of 428° C. and a contact time of 2.16 seconds with a feed gas stream comprising 126 ml. propylene, 765 ml. air and 187 ml. of water vapor per minute (S.T.P.). Over a period of 40 minutes operation at these conditions 3.04 grams of acrolein are recovered corresponding to a conversion of 24.1%, a yield of 41.6% and a space-time yield of 30.4 grams of acrolein per liter of catalyst per hour.

EXAMPLE 6

As indicated hereinabove, water can be omitted from the feed stream. Thus, Example 5 is repeated execpt that the water vapor is not added to the feed stream and propylene and air feed ratios are increased proportionately to replace the water. A feed stream comprising 153 ml. of propylene and 926 ml. of air per minute (S.T.P.) is charged to the reactor. Over 33 minutes of operation 2.74 grams of acrolein are recovered, corresponding to a conversion of 21.9%, with a 39.9% yield and a space-time yield of 31.9 grams of acrolein per liter of catalyst per hour.

EXAMPLE 7

A feed gas stream comprising 118 ml. of propylene, 130 ml. of water vapor and 726 ml. of air per minute (each at S.T.P.) is charged to the reactor described above. The temperature is 432° C. with a 2.4 second contact time. Over a period of 42 minutes operation 2.96 grams of acrolein are recovered corresponding to a conversion of 23.9%, a yield of 40.2% and a space-time yield of 26.7 grams of acrolein per liter of catalyst per hour.

EXAMPLE 8

The procedure of Example 7 is repeated with a feed stream comprising 136 ml. of propylene and 838 ml. of air per minute (S.T.P.). Over 37 minutes of operation at these conditions 3.03 grams of acrolein are recovered. The conversion to acrolein is 24%, the yield is 43.3% and the space-time yield is 32.7 grams of acrolein per liter of catalyst per hour.

EXAMPLE 9

As pointed out hereinbefore, neither component of the catalyst is effective in the process of this invention when used in the absence of the other component, as shown by this example and the three that follow. Thus, a composition comprising 30% bismuth oxide on silica is prepared by adding a solution of bismuth nitrate in dilute aqueous nitric acid to an aqueous silica sol containing 30% silica. The composition is heated and stirred until it thickens and it is then dried in an oven at 140° C. After drying, it is calcined in a muffle furnace for 6 hours. The resulting catalyst is crushed, sieved and 150 cc. (40–120 mesh) is charged to the reactor described above. A feed gas stream comprising 166 ml. propylene, 912 ml. of air and 664 ml. of water vapor per minute (S.T.P.) is fed to the reactor. The reaction temperature is 443° C. and the contact time is 2 seconds. No acrolein is formed over 30 minutes of operation.

EXAMPLE 10

In the absence of water in the feed stream the results are substantially the same as in Example 9. Thus, using the bismuth oxide and procedure as Example 9 a feed gas stream comprising 200 ml. of propylene, and 1100 ml. of air per minute (S.T.P.) is fed to the reactor. The reaction temperature is 457° C. and the contact time is 2.6 seconds. After 30 minutes of operation only 0.09 grams of acrolein is recovered, corresponding to a conversion of only 0.6%.

EXAMPLE 11

A composition comprising 33%, by weight, hexamolybdochromic acid on silica is prepared according to the procedure of Example 1. Using the same feed gas stream and procedure of Example 9, substantially no acrolein is recovered.

EXAMPLE 12

The hexamolybdochromic acid of Example 11 is used in the procedure of Example 10. Only 0.24 gram of acrolein is recovered, corresponding to a conversion of only 0.9%.

From an examination of Examples 9–12, it is evident that the two components described hereinabove are necessary to form an effective catalyst in the process of this invention; either component separately being ineffective for this same purpose.

Thus, by the practice of this invention there is provided a novel process for the oxidation of α-olefins employing catalysts that are highly active and selective in the process under the conditions employed. This process is particularly effective for the preparation of acrolein from propylene although it can also be used for the oxidation of other α-olefins containing at least 3 carbon atoms. Thus, it can also be used for the conversion of isobutylene to methacrolein, butene-1 or butene-2 to crotonaldehyde and methyl vinyl ketone and pentenes to ethyl vinyl ketone and 2-pentenal.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. The process for preparing an unsaturated aldehyde of the group consisting of acrolein and methacrolein which comprises reacting an alpha-olefin of the group consisting of propylene and isobutylene, respectively, with oxygen in which the ratio of said alpha-olefin to oxygen is about 1:0.05 to about 1:10; in which the reaction is carried out at a temperature of about 350° C. to about 550° C.; and in which the catalyst comprises (1) about 25 to about 40%, by weight, of bismuth oxide and (2) about 25 to about 40%, by weight, of hexamolybdochromic acid.

2. The process of claim 1 in which the ratio of said alpha-olefin to oxygen is about 1:0.5 to about 1:3.

3. The process of claim 2 in which said alpha-olefin is propylene and the unsaturated aldehyde obtained is acrolein.

4. The process of claim 2 in which said alpha-olefin is isobutylene and the unsaturated aldehyde obtained is methacrolein.

References Cited

FOREIGN PATENTS 605,502  10/1961  Belgium.

LEON ZITVER, Primary Examiner

R. H. LILES, Assistant Examiner

U.S. Cl. X.R.

252—456; 260—597